Jan. 27, 1942.     G. R. ELLIOTT     2,271,331
VALVE
Filed Dec. 26, 1939     2 Sheets-Sheet 2
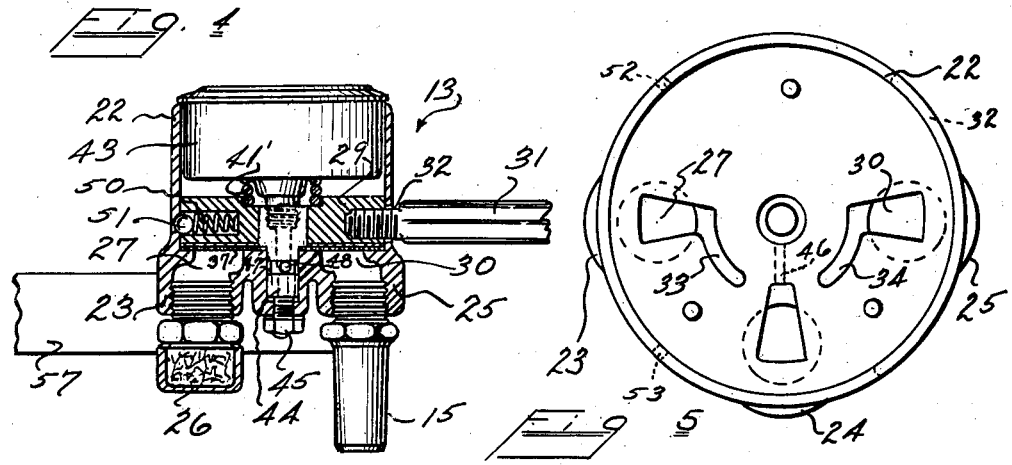
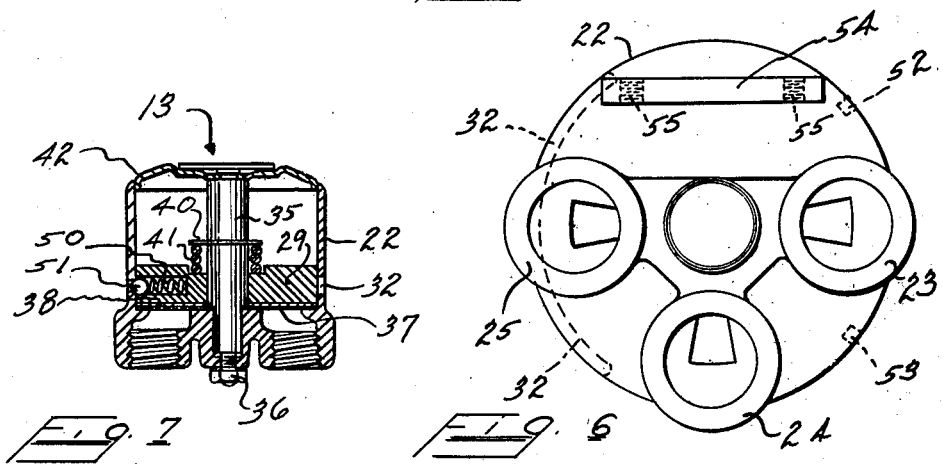
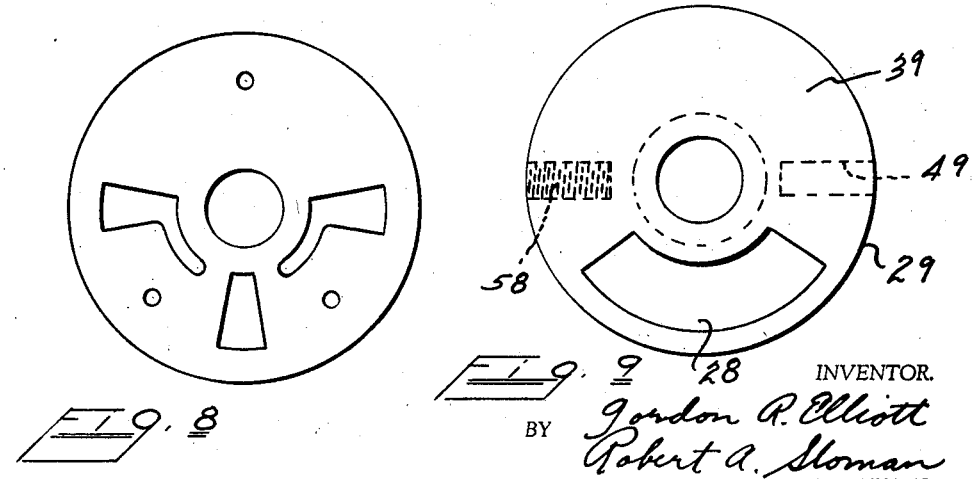
INVENTOR.
Gordon R. Elliott
Robert A. Sloman
BY
ATTORNEY.

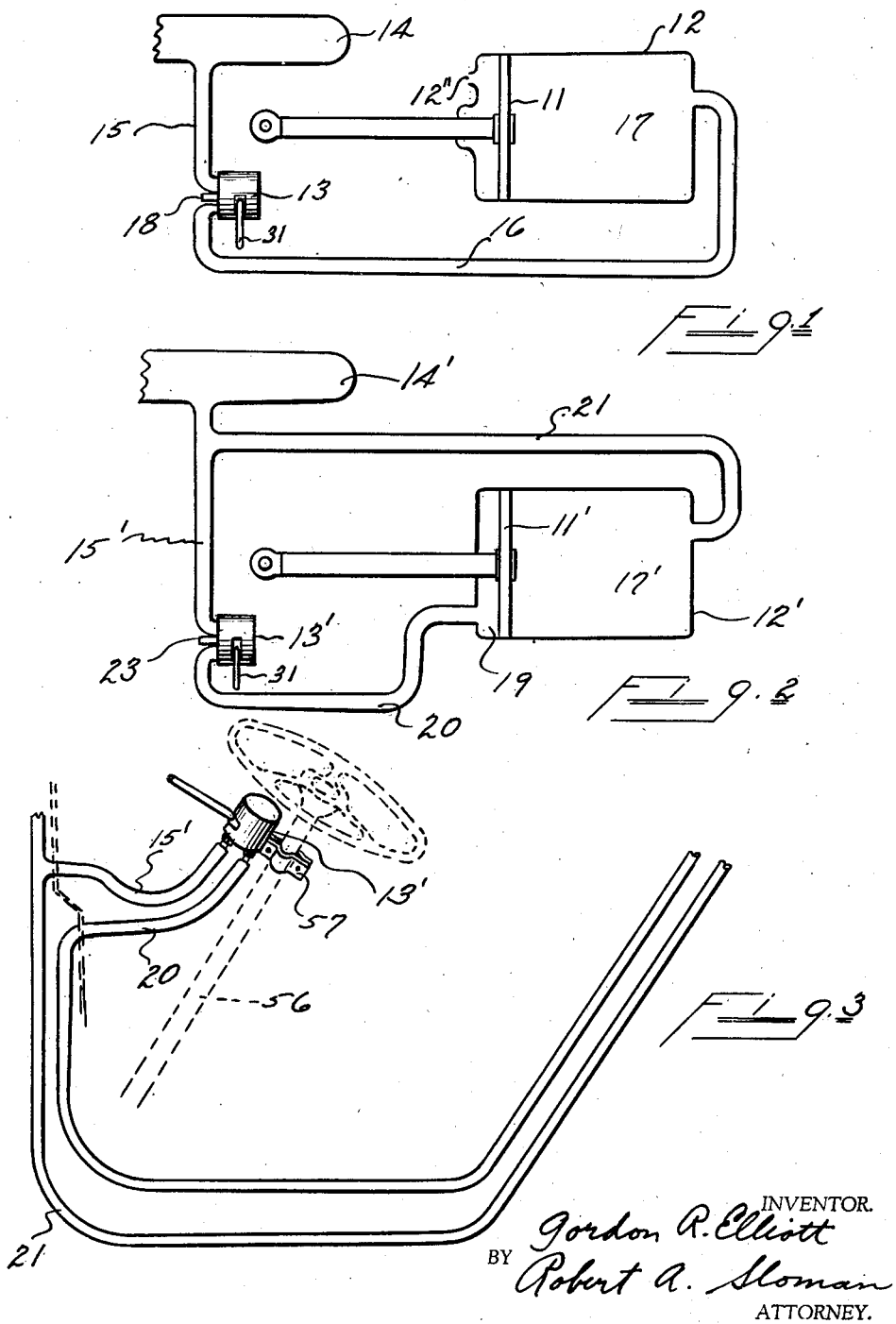

Patented Jan. 27, 1942

2,271,331

UNITED STATES PATENT OFFICE 2,271,331

VALVE

Gordon R. Elliott, Ferndale, Mich., assignor to Velvac, Inc., Detroit, Mich.

Application December 26, 1939, Serial No. 310,904

3 Claims. (Cl. 251—87)

This invention relates to a valve and more particularly to a manually operable valve for controlling air and vacuum pressure, in connection with the use of power brakes.

For the perfect control of power brakes of this type it is essential that a control valve be provided with suitable means for obtaining proper balance between air and vacuum pressures. Without this controlled balance, pressures may be built up within the brake cylinders regardless of operator's intention with consequent lack of control of the brakes.

Heretofore balance has been obtained in this type of valve by use of diaphragms and springs. Due to wear and fatigue it is seen that any balance obtained is subject to change.

The invention herein contemplates a predetermined balance of vacuum power supply by means of bleeder ports communicating with air and vacuum sources. The relation of said ports to each other in regulating the balanced outlet power flow from the valve is regulated by movement of an intermediate recess in a rotatable valve disk.

The balance obtained in this valve is not subject to changes due to wear, because the shape of said bleeder ports within the valve housing is predetermined and not subject to change.

It is the object here to provide a valve means whereby a perfect balance may be obtained therein with vacuum and air pressure, enabling an operator to perfectly regulate the operation of power brakes under all loads and circumstances.

It is the further object hereof to provide a balanced valve of the disk type, wherein means are provided to greatly diminish friction and the consequent wear and leakage which result therefrom.

It is the further object hereof to provide cushion means in connection with valve disk engaging gaskets whereby valve leakage is prevented.

It is the still further object hereof to provide a visible vacuum pressure indicating gauge or device upon the face of the manually operated power controlling valve and integral therewith.

This invention, hereinafter described in detail, consists of the various arrangements of parts and combinations thereof, as shown in the accompanying drawings illustrating therein preferable embodiments, it being expressly understood that the inventor does not intend to be limited thereby, the same being illustrated only by way of example.

In the drawings:

Figure 1 is a diagrammatical view of a single line atmosphere suspended vacuum power system.

Figure 2 is a diagrammatical view of a double line vacuum suspended vacuum power system.

Figure 3 is a diagrammatical view of the valve installation in a double line system.

Figure 4 is a sectioned elevational view of a hand controlled valve and gauge.

Figure 5 is a plan view of the housing thereof.

Figure 6 is a bottom plan view of the valve housing.

Figure 7 is a fragmentary sectioned elevational view of a hand controlled valve without the gauge.

Figure 8 is a plan view of the friction eliminating gasket and the cushion gasket.

Figure 9 is a bottom plan view of the valve disk.

Referring to the drawings, vacuum power brake units are of two distinct types, atmosphere and vacuum suspended. Both units utilize vacuum taken off the intake manifold of an internal combustion engine, said vacuum being created by the pumping action of the pistons.

When the air suspended power unit illustrated in Figure 1 is inoperative atmospheric pressure is equal on both sides of the brake operating piston 11, said piston being designed for longitudinal movement within cylinder 12.

The manually operated control valve 13 communicates with the engine intake manifold 14 through conduit 15. Operation of valve 13 allows the vacuum to communicate with one end of said power cylinder through connecting pipe 16. Instantly the air in portion 17 of cylinder 12 is withdrawn; and at the same time air is admitted to the opposite side of cylinder 12 through opening 12' exerting a pressure which causes longitudinal movement of piston 11 for applying power to the brake system.

When the valve is in inoperative position the air inlet 18 is open whereby atmosphere communicates through pipe 16 to portion 17 of cylinder 12, means being provided whereby the piston 13 is automatically returned to its original position as shown in Figure 1.

The valve embodying my invention is equally applicable to the vacuum suspended double line power unit illustrated in Figure 2, wherein said valve 13' similarly communicates with the intake manifold 14' through conduit 15'. With the valve 13' in inoperative position vacuum communicates with portion 19 of cylinder 12' through conduit 2. Vacuum is also produced in the other side 17' of cylinder 12' by pipe 21 which also communicates with the intake manifold 14.

On actuating valve 13' air is admitted through inlet 23 where through conduit 20 it enters portion 19 of cylinder 12' thereby forcing piston 11' to move longitudinally to apply mechanical power to the brake system suitably connected thereto.

Valve 13, as will now be more specifically described, is designed to regulate the flow of air and vacuum therethrough, whereby the operator may obtain any type of desired control over the power brakes. More particularly the principle embodied is the proper mixing of air and vacuum sources whereby perfect balance is obtained securing smooth operation of the brakes.

The housing 22 of valve 13 substantially cylindrical in shape is provided on its base, as shown in Figure 6, with downwardly depending interiorly threaded connecting means 23, 24 and 25.

The connection 23 has threaded therein a suitable inlet filter 26 otherwise communicating with the atmosphere. Connection 23 through passage 27 further communicates intermittently with recess 28 in the under side of rotatable disk 29.

The connection 25 is designed for threaded engagement with vacuum conduit 15' which communicates with the intake manifold 14 as illustrated in Figure 2. The vacuum source further communicates intermittently through passage 30 with said recess 28 in the under side of disk 29.

The connection 24 designed for threaded engagement with a suitable conduit 20 as shown in Figure 2, or conduit 16 as shown in Figure 1, provides power communication to the power cylinder 12 as the case may be.

It will be seen that arcuate recess 28 of disk 29 provides means of communicating intermittently between connections 23 and 24 and connections 25 and 24 depending upon the radial position of said disk. When said recess communicates with connections 23 and 24 air is free to enter the valve through strainer 26 and emerge through connection 24, where it communicates with conduit 16, as shown in Figure 1, when the single line unit is used, to maintain piston 11 in inoperative position. By rotating disk 29 by means of handle 31 operable within a transverse slot 32 in housing 22, said air supply is gradually shut off, at the same time as slot 28 becomes so positioned as to provide communication between connections 24 and 25. It is seen then that vacuum power is available from manifold 14 and conduit 15 for supplying chamber 17 of cylinder 12.

If the air supply through connection 23 and passage 27 were entirely cut off when the vacuum power was made available, through connection 25 and passage 30, complete application of the brakes would result; which is desirable for sudden stopping. However, the operator more often desires to come to a stop gradually. To accomplish this result means are provided herein whereby partial braking is obtained by allowing air to mix with the available vacuum power.

In order to obtain a balance between air and vacuum power flowing through connection 24 bleeder ports 33 and 34 are provisioned in the base of valve housing 22 communicating respectively with inlets 23 and 24 as shown in Figure 5.

Bleeder port 33 provides a means whereby air is still available to connection 24 even though the vacuum power is cut in, which means that the vacuum in connection 24 is mixed therewith allowing a balanced vacuum pressure to be applied gradually.

Similarly the vacuum power is made gradually available through bleeder port 34, as disk 29 is rotated. It is important to notice that the provision of bleeder ports 33 and 34 enables a particular predetermined vacuum pressure to be maintained instead of being built up. By allowing disk 29 which is controlled by handle 31, to remain in any particular radial position, the power source to connection 24 may be balanced perfectly and maintained at a constant pressure. By further rotation of disk 29 more vacuum pressure is made available and at the same time the air pressure is decreased.

With disk 29 moved to its extreme position there can be no bleeding and the air supply will be cut off entirely; similarly by being moved to the opposite extreme position, there can be no bleeding and the vacuum supply will be cut off entirely.

In other words when operator wants full braking effect he can get it; and similarly when he wants full release of the brakes he can get it. Ordinarily the operator desires partial braking which obviously does not require full vacuum pressure. Consequently the drop of vacuum or pressure loss created by bleeding air into the vacuum supply does not effect braking, because only partial braking is desired.

When the valve 13 is used in connection with the double line power system, illustrated in Figure 2, it will be seen that for brake release the recess 28 on disk 29 must be located in its extreme position so as to allow a full vacuum pressure to flow continuously into valve 13 through connection 25, out through connection 24, through pipe 20, and into chamber 19 of cylinder 12'.

Actuation of the arm 31 in slot 32 of the valve housing 22 tends to decrease the vacuum supply, allowing air to bleed into recess 28 of valve disk 29 through connection 23 and bleeder port 33 where it mixes with the vacuum in the manner hereinbefore described, whereby a predetermined balance may be obtained between the air and vacuum pressure.

By continuing movement of disk 29 and utilizing bleeder port 34 it will be seen that the vacuum supply will be gradually shut off to the extent desired. At the same time the air supply through connection 23 and passage 27 is increased to the extent desired whereby piston 17 in cylinder 12' is caused to move to actuate the brakes.

The pivot 35 in Figure 7 centrally disposed within valve housing 22 for journaling the rotatable disk 29 is fixedly secured to said housing, its lower threaded portion being suitably bolted thereto at 36.

A cushion gasket 37, a plan view of which is shown in Figure 8, made of any suitable resilient material, immovably rests upon and within the valve housing, it being noted that in plan said gasket corresponds exactly in shape to the base plan of the valve housing as illustrated in Figure 5.

Gasket 38 is made of any suitable hard surfaced material, which is substantially noncompressible and has a low coefficient of friction. Gasket 38 immovably rests upon gasket 37, being identical in plan as shown in Figure 8.

Rotatable disk 29 with its under surface 39 preferably nickel plated or otherwise rendered very hard, is designed to anti-frictionally rest and rotate upon said gasket, said. Said surface being as flat as possible.

The cushion gasket 37 provides a resilient base for the gasket whereby disk 29 rotates thereon in perfect sealing contact. Without the cushion and gasket it would be necessary to lap surface 39 of disk 29, and the valve housing with a grinding compound, until an air tight fit was obtained therebetween. This is an expensive and time consuming operation, and is entirely eliminated by the provision of the aforesaid gaskets.

Variations in surface 39 of disk 29 and in the valve housing would always produce some leakage. This is all overcome by the resilient cushion gasket 37, whereby a perfect contact is continuously maintained between said gasket 38 and valve disk 29.

The gasket 28 is designed to make friction upon the surface 39 of disk 29 a minimum. Consequently the wear thereof is a minimum and as a result there is no leakage.

A washer 40 fixedly secured to pivot 35 above disk 29 retains a coil spring 41 therebetween whereby resiliency is created between disk 29, gaskets 37 and 38 and the valve housing 22. The cover 42 suitably riveted to pivots 35 provides a closure for valve 13.

A slightly different type of pivot arrangement is provided as shown in Figure 4 whereby a vacuum gauge 43 is inserted within the valve housing 22 and threadably secured to the connector 44, a spring 41' being interposed between said gauge and rotatable disk 29. Said connector pivotally journaling the disk 29 is suitably secured to the valve housing at point 45.

Access from connection 24 to vacuum gauge 43 is obtained by the passage 46 in the valve housing. Said passage communicates with the recessed portion 47 and opening 48 in the aforesaid hollow connector 44, the latter in turn communicating with vacuum gauge 43, as above described.

It will be noted that vacuum gauge 43 is entirely built within the valve housing 22, communicating with outlet connection 24, whereby the vacuum pressure therein is definitely and accurately registered.

Recess 49 in disk 29 has disposed therein a coil spring 50 and ball bearing 51. Said ball bearing is resiliently positioned within said recess to register with either opening 52 or 53 in valve housing 22, said openings corresponding respectively to the extreme positions of handle 31, whereby a snap locking engagement is made between valve disk 29 and the valve housing 22.

It will be noticed that in the extreme locked positions of disk 29, the recess 28 is so positioned with respect to connections 23, 24 and 25 that only air or only vacuum is conducted respectively through connection 24.

Referring to Figure 6, it will be seen that the bottom of the valve housing is provided with a rectangular depending projection 54 with threaded openings 55. This projection provides means whereby the valve may be suitably secured to a steering wheel column 56 with a mounting bracket 57 secured therebetween as shown in Figure 3.

Referring to Figure 9 it will be seen that valve disk 29 is provided with a threaded opening 58 within which may be removably inserted handle 31.

Having described the invention illustrated only by way of example in the accompanying drawings, reference should now be had to the claims which follow for determining the scope of my invention.

I claim:

1. A control valve for a vehicle braking system, employing air and vacuum pressures comprised of a housing with air and vacuum inlet openings and an intermediate outlet opening, with intermediate slotted arcuate recesses of substantially reduced cross section in said housing communicating with said air and vacuum inlet openings and extending toward said outlet opening defining bleeder ports, a rotatable disk disposed within said housing with an arcuate recess therein extending in length a substantially small portion of said disk, said recess being adjacent said openings, adapted to establish communication alternately between either inlet opening and said outlet opening, and having its smaller radius slightly less than the outside radius of said bleeder ports, so that said recess is positioned to overlap in communicating relation a relatively small portion of the width of said bleeder ports upon rotation of said disk, whereby as said disk is rotated gradually cutting off an inlet and its communicating bleeder port, communication is gradually and adjustably established with the other bleeder port, permitting variable proportions of air and vacuum from said inlets respectively to travel through said recess for communication with said outlet, for accomplishing balanced braking control at varying degrees of vacuum throughout a relatively long circumferential movement of said disk.

2. A control valve for a vehicle braking system comprised of a housing with air and vacuum inlet openings and an intermediate outlet opening, with intermediate slotted arcuate recesses of substantially reduced cross section in said housing communicating with said air and vacuum inlet openings and extending toward said outlet opening defining bleeder ports, a rotatable disk disposed within said housing with an arcuate recess therein, said recess being adjacent said openings, adapted to establish communication alternately between either inlet opening and said outlet opening, and having its smaller radius slightly less than the outside radius of said bleeder ports, so that said recess is positioned to overlap in communicating relation a relatively small portion of the width of said bleeder ports upon rotation of said disk, whereby as said disk is rotated gradually cutting off an inlet and its communicating bleeder port, communication is gradually and adjustably established with the other bleeder port, permitting balanced braking control at varying degrees of vacuum throughout a relatively long circumferential movement of said disk.

3. A control valve for a vehicle braking system comprised of a housing with air and vacuum inlet openings and an outlet opening, with slotted arcuate recesses of substantially reduced cross-section in said housing communicating with said air and vacuum inlet openings defining bleeder ports, a rotatable disk disposed within said housing with an arcuate recess therein, adapted to establish communication alternately between either inlet opening and said outlet opening, and having its smaller radius slightly less than the outside radius of said bleeder ports, so that said recess is positioned to overlap in communicating relation a relatively small portion of the width of said bleeder ports upon rotation of said disk, whereby as said disk is rotated gradually cutting off an inlet and its communicating bleeder port, communication is gradually and adjustably established with the other bleeder port.

GORDON R. ELLIOTT.